(No Model.)
E. H. BELDEN.
THILL COUPLING.
No. 371,410. Patented Oct. 11, 1887.
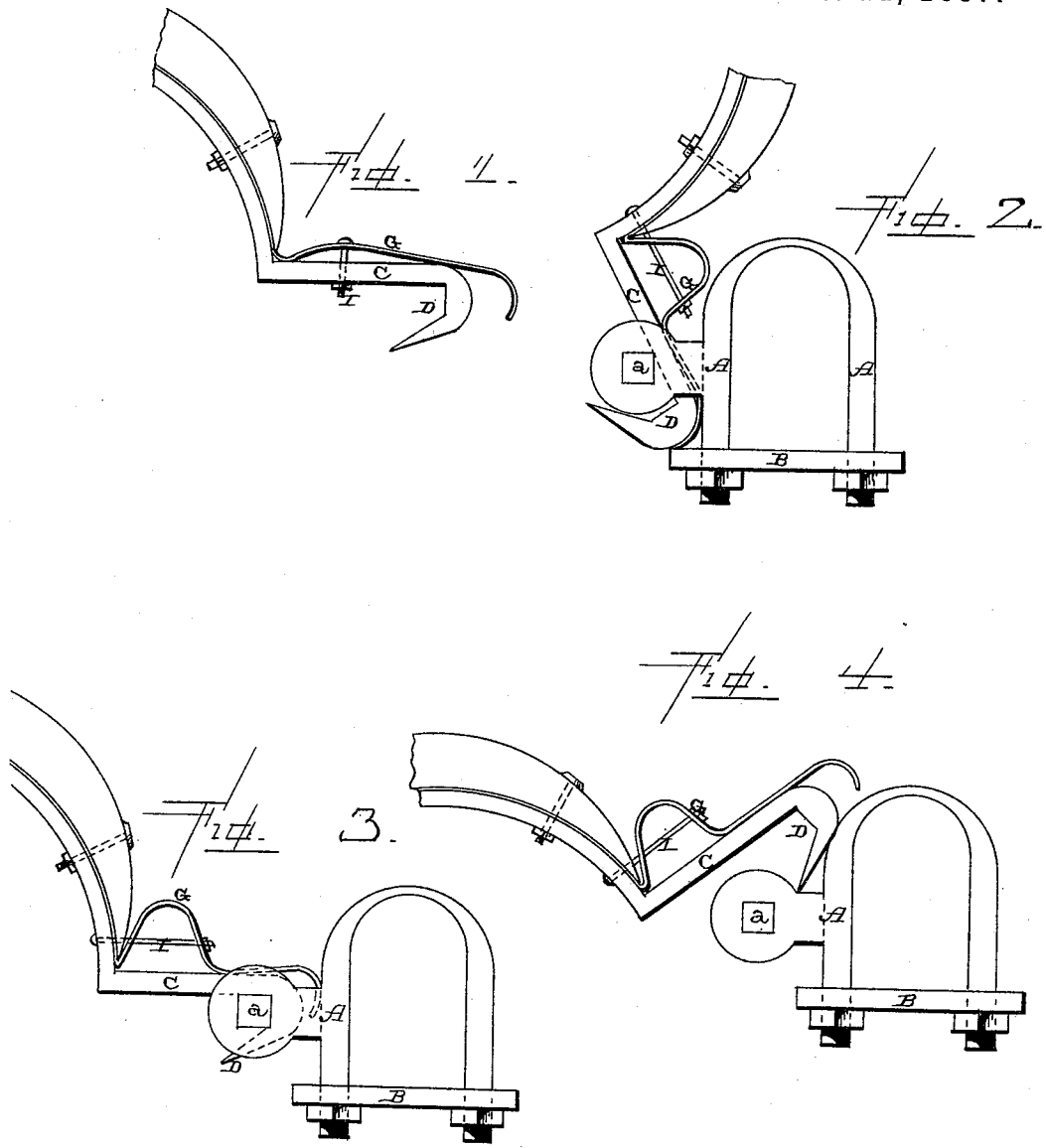
Witnesses.
L. F. Gardner
Edm. P. Ellis.
Inventor.
E. H. Belden,
per F. A. Lehmann,
atty.

United States Patent Office.

EUGENE H. BELDEN, OF HORTON, MICHIGAN.

THILL-COUPLING.

SPECIFICATION forming part of Letters Patent No. 371,410, dated October 11, 1887.

Application filed August 6, 1887. Serial No. 246,331. (No model.)

*To all whom it may concern:*

Be it known that I, EUGENE H. BELDEN, of Horton, in the county of Jackson and State of Michigan, have invented certain new and useful Improvements in Thill-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in thill-couplings; and it consists in, first, the combination of the thills, thill-irons having straight shanks and angular hooks made upon their ends, with the clip which is secured to the axle, whereby the thill-irons have an endwise movement through the clip when the outer ends of the thills are raised upward, and the thill-irons can only be detached from the clips while the outer ends of the thills are dropped down to the ground; second, the combination of the thill-irons and the clip with an adjustable spring and a regulating-screw, whereby the spring can be adjusted so as to prevent rattling of the couplings when the vehicle is in motion, as will be more fully described hereinafter.

The object of my invention is to provide a thill-coupling in which the parts are so constructed that the shaft can be held in an upright position when not in use, and the thills can be detached only when their outer ends are in a lowered position, resting on the ground, and that without removing a bolt or unfastening any part of the coupling, and to make the spring adjustable, so that it can be adjusted to the clip from time to time and thus prevent rattling.

Figure 1 is a side elevation of a thill-coupling embodying my invention, showing one form of spring. Fig. 2 is a similar view showing the thills in a raised position and with another form of spring. Fig. 3 is a similar view showing the thills in a horizontal position. Fig. 4 is a similar view showing the outer ends of the thills lowered and the thill-iron detached from the clip.

A represents an ordinary clip, such as is used in connection with all axles; and B, the cross-bar or plate which connects its lower ends below the axle, and which in this instance also serves as a stop for the movement of the thill-irons when the thills are raised upward. The shank C of the thill-iron is made perfectly straight, as shown, and has the hook D formed on its inner end, the inner side of the hook being formed of two angles, as shown, so as to adapt it to be detached from the clip only when the outer ends of the thills are lowered to the ground, and the hook D can be raised upward at the angle shown in Fig. 4. When this hook catches over the bolt or bar a, which passes through or connects the two ears of the clip A together, the point of the hook passes under the bolt, so that the thill-iron can only be detached when it can be moved backward at such an angle that the point of the hook will pass from under the bolt.

When the outer ends of the thills are raised upward, there being nothing to prevent, the shank C of the thill-iron drops downward through the clip until the hook D strikes against the projecting end of the plate B, which forms both a stop and a partial support for the thills while in this raised position.

In order to have the thills remain in a raised position, so as to be out of the way when not in use, or so that the horse can be backed into place, it is only necessary to raise the front ends of the thills upward, when by the dropping of the shanks of the thill-irons through the clips the thills will be held securely. In order to lower the thills, it is first necessary to raise them upward until the hook D engages with the bolt or cross-bar of the clip, and then their outer ends can be lowered either into a horizontal position or to the ground, as may be desired.

It will be seen by the construction here shown and described that it is never necessary to remove or unfasten any part of the coupling for the purpose of detaching the thills, and that the thills will automatically adjust themselves so as to be held in a raised position by simply raising their outer ends upward. As the thills can only be detached when their outer ends are lowered to the ground, it will readily be seen that they can never become detached while fastened to the horse.

In order to prevent rattling, the spring G is fastened at its front ends between the wood of the thill and the thill-iron; and is then fastened by means of an adjusting-screw, I. This spring may either be curved and have the tightening-screw passed vertically through the shank of the thill-iron, as shown in Fig. 1, or the spring may be bent into a bow and the set-screw passed horizontally through it into the iron of the thill, as shown in Figs. 2, 3, and 4. The rear end of the spring is curved downward and projects just far enough beyond the hook D to bear against the inner side of the clip and thus prevent rattling. By loosening or tightening the set-screw this projecting end of the spring can be drawn inward or outward, at the will of the operator, and thus made to exert a greater or less pressure against the front side of the clip, as may be desired.

Having thus described my invention, I claim—

1. The combination of the clips secured to the axle, and the plates B, with the thills, and the thill-irons provided with the angular hooks D, the rear ends of the irons being adapted, by having straight shanks C, to pass down through the clips and to rest upon the plates B, substantially as described.

2. The combination of the thills, the thill-irons, and the clips with the curved or bent springs and the set-screws for regulating the distance that the ends of the springs shall extend beyond the rear ends of the thill-irons, substantially as set forth.

In testimony whereof I affix my signature in presence of two witnesses.

EUGENE H. BELDEN.

Witnesses:
W. C. LEWIS,
L. O. BEEBEE.